Figure 6:
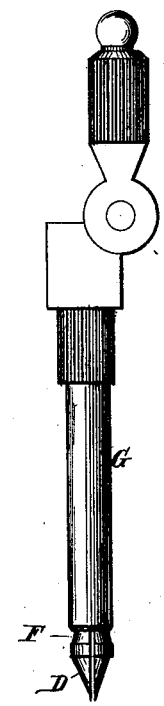

J. R. PEEL.
DRAWING INSTRUMENTS.
No. 191,611. Patented June 5, 1877.
3 Sheets—Sheet 1.
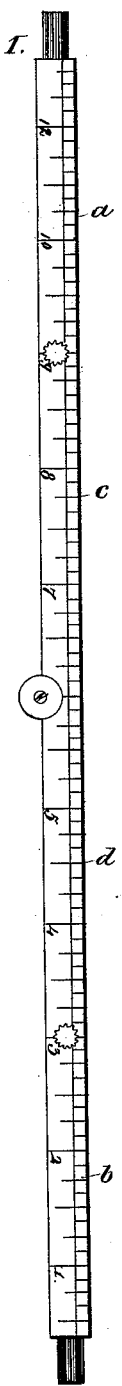
Fig. 1.
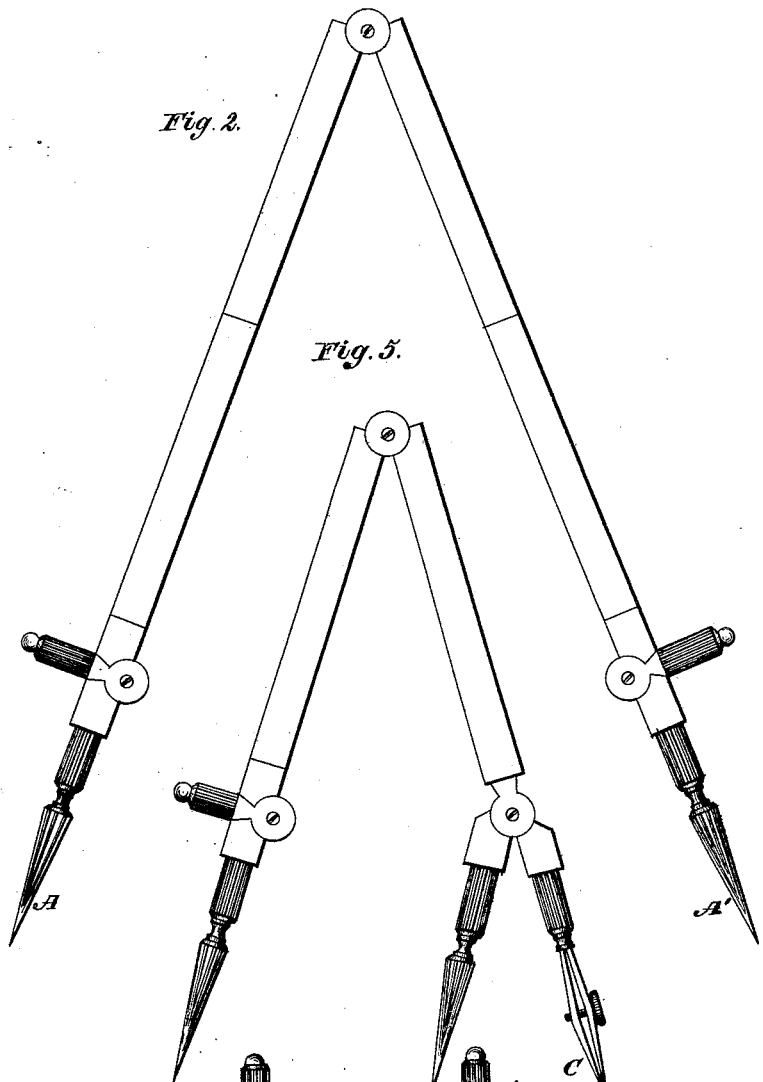
Fig. 2.
Fig. 5.
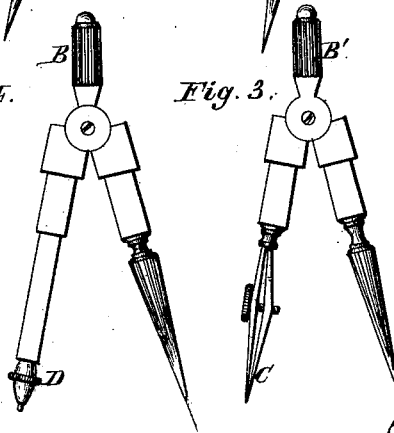
Fig. 4. Fig. 3.
Attest.
Henry Beech
Thomas Buch
Inventor.
Jno. R. Peel

J. R. PEEL.
DRAWING INSTRUMENTS.

No. 191,611. Patented June 5, 1877.

3 Sheets—Sheet 2.

Attest:
Henry Beech
Thomas Beech

Inventor
Jno. R. Peel

J. R. PEEL.
DRAWING INSTRUMENTS.
No. 191,611. Patented June 5, 1877.
3 Sheets—Sheet 3.
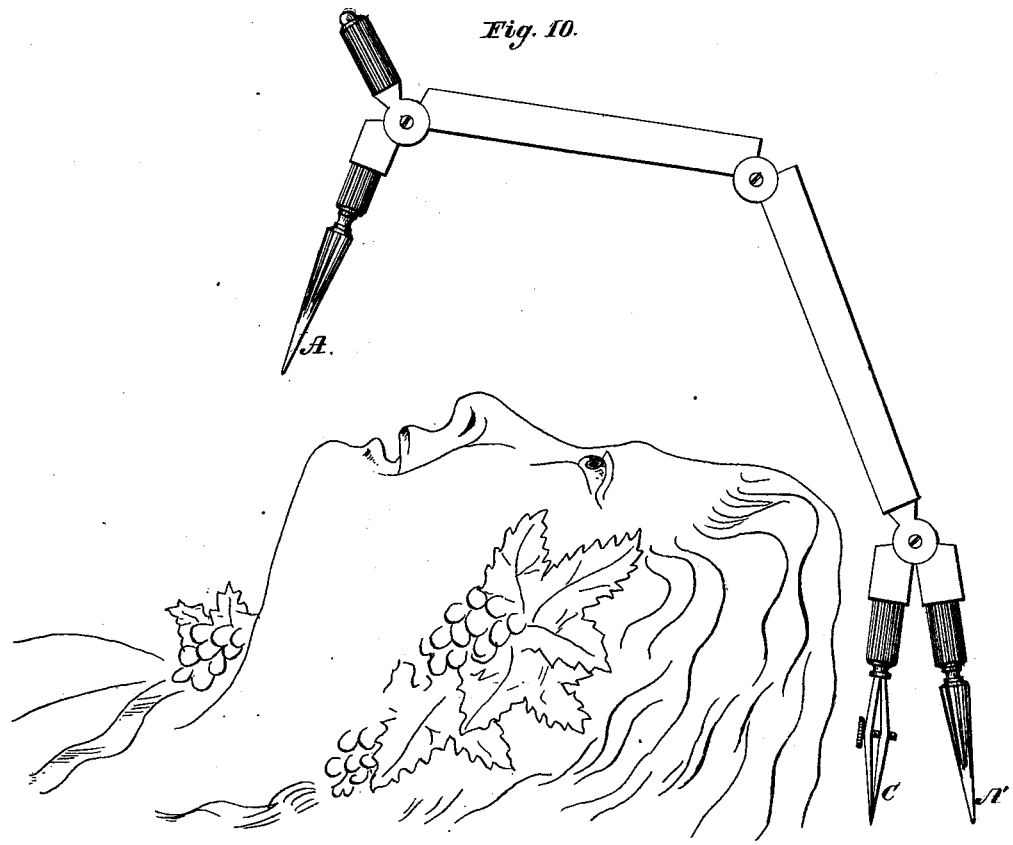
Fig. 10.
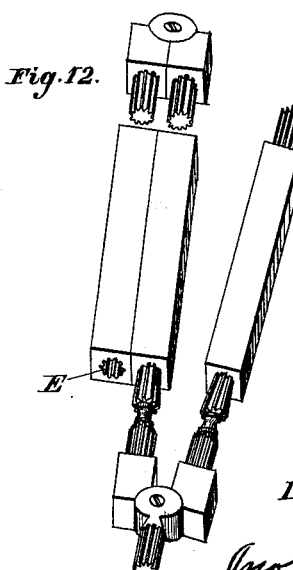
Fig. 12.
Fig. 11.
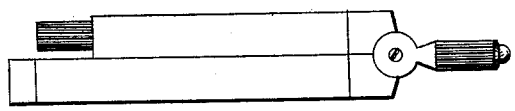
Attest.
Henry Beech
Thomas Beech
Inventor.
Jno. R. Peel ent opened as a foot-rule. Other sides of the bars are marked with various scales, and each section will contain a separate scale; and on one side the rule is marked with the degrees of the circle, so that when folded triangularly it will serve for a protractor.

UNITED STATES PATENT OFFICE.

JOHN R. PEEL, OF LONDON, ONTARIO, CANADA.

IMPROVEMENT IN DRAWING-INSTRUMENTS.

Specification forming part of Letters Patent No. 191,611, dated June 5, 1877; application filed January 13, 1877.

*To all whom it may concern:*

Be it known that I, JOHN ROBERT PEEL, of the city of London, in the county of Middlesex, and Province of Ontario, Canada, have invented certain new and useful Improvements on Drawing-Instruments; and I hereby declare that the following is a full, clear, and exact description of my invention:

My invention consists, briefly, of a foot-rule constructed of hollow bars of brass or other material, arranged in sections, and connected by joints formed of sections of fluted steel, fitting into sockets of corresponding shape at the ends of said bars, and so constructed that, by taking to pieces and combining in various specified ways, all the drawing-instruments usually contained in a full box, together with several additional ones, are contained in a size sufficiently small to allow of its being carried in the vest-pocket, all which will be found fully set forth in the following paragraphs of this specification, reference being had to the accompanying drawings, where—

Figure 7:
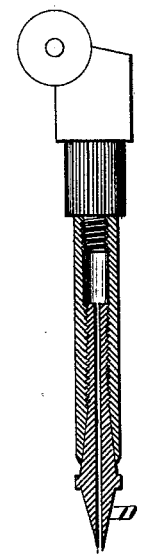
Figure 8:
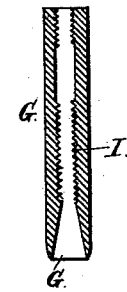
Figure 9:
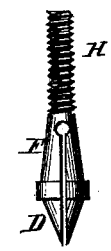

Figure 1 shows the instrument jointed to form a foot-rule. Fig. 2 shows the large compasses. Fig. 3 shows the pen-dividers. Fig. 4 shows the pencil-dividers. Fig. 5 shows the three-legged compasses. Fig. 6 shows the pencil-point. Fig. 7 shows the section of same. Fig. 8 shows the socket of pencil. Fig. 9 shows the cone of pencil. Fig. 10 shows the depthing-tool. Fig. 11 shows the instrument folded for pocket. Fig. 12 is a perspective view, showing joints, &c.

Fig. 1 shows the instrument opened as a foot-rule. Other sides of the bars are marked with various scales, and each section will contain a separate scale; and on one side the rule is marked with the degrees of the circle, so that when folded triangularly it will serve for a protractor.

On removing the two end sections *a b* and reversing them, a large pair of compasses, as shown at Fig. 2, is produced, to be used with or without pencil or pen, such pencil, &c., being at other times concealed in the hollow bars. When the two sections *a b* are entirely removed, and the pencil and pen points are inserted in the sockets of the bars, a medium-size pair of compasses is obtained; or it may be used with pen or pencil on inserting either of points A A' in the sockets, leaving the pencil or pen projecting.

Figs. 3 and 4 show the bow pen and pencil as they appear when withdrawn entirely from the bars. These instruments may also be attached to the bars by inserting the fluted joints B B' in the sockets E, and a pair of four-legged compasses is obtained; or, when only one is so attached, a pair of three-legged compasses, as shown at Fig. 5, is produced, for mapping, &c., the fourth point being now concealed in the bar. Fig. 6 is a separate drawing of the pencil-point, and Fig. 7 is a sectional view of same. On reference to these drawings, it will be seen that the lead is contained in a cone-shaped tube, F, which is split to allow of its expansion and contraction by means of the outer tube G, which fits around it.

The upper end H of the conical tube F is threaded, and a corresponding female thread, I, is formed in the tube G, to receive it and retain it in its place. The lead, being inserted in the cone F, is pushed forward so as to project slightly beyond the orifice; the cone is then inserted in the outer tube G and screwed therein, and as the cone retreats into this tube the split jaws are clutched by the mouth of the tube G tightening upon them, and the pencil is firmly held in position.

The other end of the outer tube has a female thread formed in it, by which it is screwed to one of the fluted joints, as shown in Figs. 6 and 7. By this description it will be seen that a compact form of pencil, capable of being inserted in any of the bars when out of use, is obtained, while at the same time the lead may be readily protruded as it wears away, and always possesses a sharp and perfectly rigid point.

A ruling pen or pencil is formed by jointing the opposite leg A or A', as the case may be, in a single one of the bars of the compasses, and allowing the pen C or pencil D to project in a line therewith. A pair of calipers is formed by folding the compasses with the legs A and A' bent so that their points will approach each other.

Fig. 10 shows the instrument arranged as a "depthing-tool" for the use of sculptors or carvers. The points A' and C form the base, and with the other point, A, the heights of all the projections of a face or other object are measured, and these measurements transferred to the stone or wood.

The construction of the joint enables the different bars to be turned at any desired angle, so that every projection in the object can be easily measured and transferred.

I claim as my invention—

1. As a new article of manufacture, a foot-rule consisting of a series of hollow bars, *a b c d*, connected by joints of fluted steel, B B', and corresponding sockets E, substantially as shown and described, and for the purpose set forth.

2. The screw pencil-point D, consisting of split cone F and outer tube G, with corresponding threads H I, in combination with a pair of drafting-compasses, substantially as shown and described, and for the purpose set forth.

3. The hollow bars *a b c d*, fluted joints B B', and sockets E, in combination with pen C, pencil D, and points A A', all arranged and operating substantially as shown and described, and for the purpose set forth.

JOHN R. PEEL.

Witnesses:
PHILIP J. EDMUNDS,
THOMAS BEECH.